United States Patent [19]

Huang

[11] Patent Number: 5,425,054
[45] Date of Patent: Jun. 13, 1995

[54] SURROUNDING CIRCUIT FOR THE ETHERNET COAXIAL LOCAL AREA NEWTWORK TRANSCEIVER

[75] Inventor: Mark P-S. Huang, Taipei, Taiwan, Prov. of China

[73] Assignee: Tamarack Microelectronics Inc., Taipei, Taiwan, Prov. of China

[21] Appl. No.: 80,234

[22] Filed: Jun. 23, 1993

[51] Int. Cl.$^6$ .................. H04B 3/00; H04L 25/00
[52] U.S. Cl. .................. 375/258; 375/219; 375/295; 327/170; 327/100
[58] Field of Search ............ 375/7, 10, 36, 59, 60, 375/75, 58; 455/67.3; 370/85.1, 85.13; 307/260, 261, 263, 265, 268

[56] References Cited

U.S. PATENT DOCUMENTS

| | | | |
|---|---|---|---|
| 4,649,548 | 3/1987 | Crane | 375/36 |
| 4,710,943 | 12/1987 | Duley et al. | 375/7 |
| 5,128,962 | 7/1992 | Kerslake et al. | 375/7 |

Primary Examiner—Stephen Chin
Assistant Examiner—Don Vo
Attorney, Agent, or Firm—Varndell Legal Group

[57] ABSTRACT

A surrounding circuit for the local area network transceiver comprises isolation transformer, electric resistance, Diodes, transmitting circuit, transistor, electric capacitor, and input circuit; in order to slow down the rising time and falling time of the signal, the circuit can effectively improve the output signal waveform at the secondary coil of the isolation transforming and make it similar to sine wave which decreases the possibility of high frequency radiation. The circuit also provides a receiving surrounding circuit connected to the output of the transmitting surrounding apparatus which can eliminate the Common Mode Noise, has the effect of isolation, and at the same time allows the low-frequency collision signal to enter the transceiving circuit and maintains enough high input impedance.

5 Claims, 9 Drawing Sheets

SURROUNDING CIRCUIT FOR THE ETHERNET COAXIAL LOCAL AREA NEWTWORK TRANSCEIVER

BACKGROUND OF THE INVENTION

The invention relates to a surrounding circuit for the coaxial Ethernet/Cheapernet Type local area network transceiver (FIG. 3) especially which is applied to improve the rising time and falling time of the signal and eliminate the Common Mode Noise, and that can have the effect of isolation.

In the situation of high-speed transmission, the rising time and falling time of the signal is very short and many high-frequency components inside can cause an Federal Communications Commission (FCC) failure. In addition, the network signal must be isolated from the local transceiving surrounding apparatus to achieve the objectives of eliminating the Common Mode Noise and preventing the static discharge.

Moreover, in the signal of the Ethernet/Cheapernet Type coaxial local area network, besides that of the high-frequency signal the low-frequency components must be monitored by the transceiver as well, to detect the collision.

To sum up, the surrounding circuit must achieve the following seven missions.

(1) Transmitting the network signal with good waveform. (controlled rising time and falling time)
(2) Electrical isolation or the transmitting and receiving circuits from the network without interfering with the input and output of the normal signal.
(3) Enabling the high-frequency signal to be monitored by the transceiving circuit.
(4) Enabling the low-frequency collision signal to be monitored by the transceiving circuit as well.
(5) Maintaining the high input impedance without affecting the network operation.
(6) Requiring the high output impedance (similar to current source) to show an additive effect. When two transmitters transmit simultaneously, the signal must add up to indicate the Collision.
(7) The transceiving surrounding apparatus can operate normally without additional power supply or a DC/DC converter.

In view of this, the inventor considered providing a kind of circuit which not only enables the required output signal waveform similar to the sine wave, but also eliminate the Common Mode Noise and has the effect of isolation. Meanwhile, it can maintain sufficient high input/output impedance, and detect a collision condition.

SUMMARY OF THE INVENTION

The main objective of the invention is to provide a controlled rising time and falling time of the signal to make its output waveform similar to the sine wave so as to decrease the possibility of a FCC violation.

Another objective of the invention is to provide the complete isolation of the signal from the transmitting and receiving circuits.

A further objective of the invention is to maintain the large input impedance and the launching method of the current source to achieve the high output impedance.

A further objective of the invention is to allow the low-frequency Collision signal to be properly detected by the receiver without affecting the receiving of the normal high-frequency signal.

The last objective of the invention is to achieve the aforesaid objectives with the surrounding circuit power itself instead of an independent power supply.

The aforesaid objectives can be achieved with the invention. The invention can isolate the transmitting circuit from the load resistance with the transformer and forms a waveshaping circuit with the elements like an electric capacitor, an electric resistance transistor and a secondary coil. Furthermore, it forms a current source circuit with the characteristic of the transistor which functions like a current source to increase the output impedance. Then, a series connected diode between the transistor and the input/output ends maintains high impedance when the current source is off. The waveshaping circuit makes the signal at the output similar to the sine wave and slows down the falling time and rising time of the transmitter. A receiving surrounding circuit is connected to the output end of the transmitting surrounding apparatus, so that the potential difference of the Common Mode Noise at the two ends of the coil is zero and no Common Mode Noise will occur. One end of the receiving transformer coil is connected with a diode and a resistance in series connection s cross connected to one end of the transistor and forms a current loop which maintains high impedance when the transceiver is receiving signals and allows low-frequency Collision to enter the receiving circuit when transmitting signals.

The following concrete embodiment examples shall describe in detail the invention according to the Figures attached.

DETAILED DESCRIPTION OF THE PREFERRED EMBODIMENT

Figure 1:
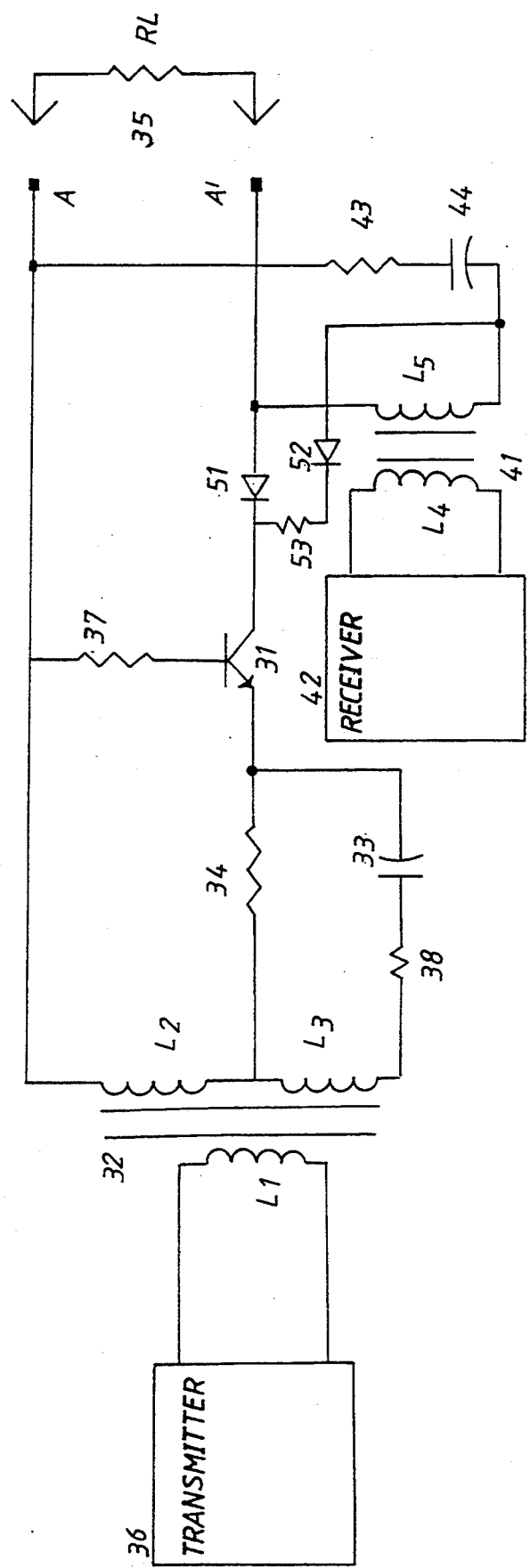
FIG. 1 is an example for the complete circuit drawing of the surrounding circuit for the local area network transceiver.
Figure 3:
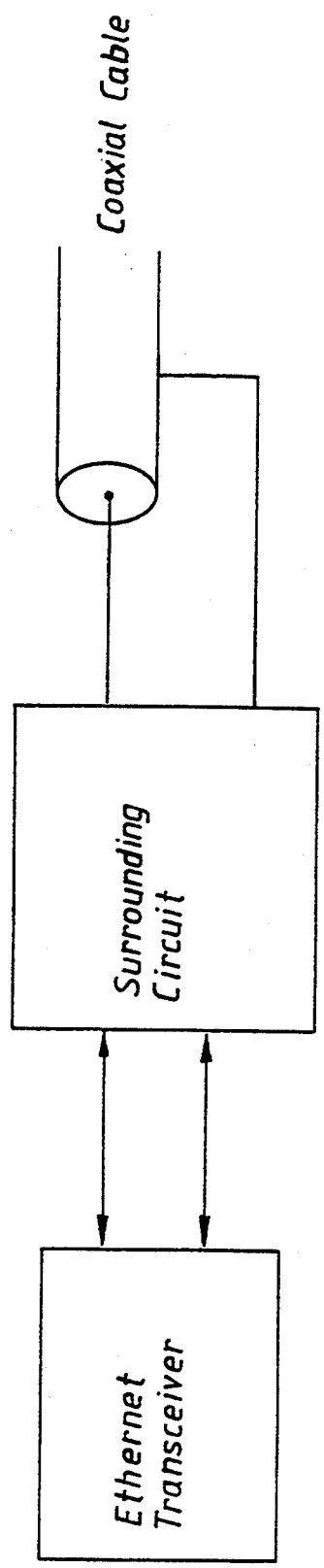
FIG. 3 shows the relation Between the surrounding circuit and coaxial Ethernet transceiving of the present invention.

Referring to FIG. 1, the surrounding circuit for the local area network transceiver comprises transformers 32, 41, electric resistances 34, 37, 38, 53, 43, electric capacitors 33, 44, diodes 51 52 a transistor 31, a load electric resistance 35 and output ends A, A' among which a transformer 32 is composed of a basic coil L1, and secondary coils L2, L3 and a transformer 41 is composed of a basic coil L4 and a secondary coil LB. The relationship of the surrounding circuit and the transceiver (Transmitter and Receiver) is shown in FIG. 3. More specifically, in FIG. 1, a transmitter 36 is connected to L1 of transformer 32, and a receiver 4Z is connected to L4 of transformer 41.

A surrounding circuit contains a transmitting surrounding circuit and a receiving surrounding circuit.

Figure 2:
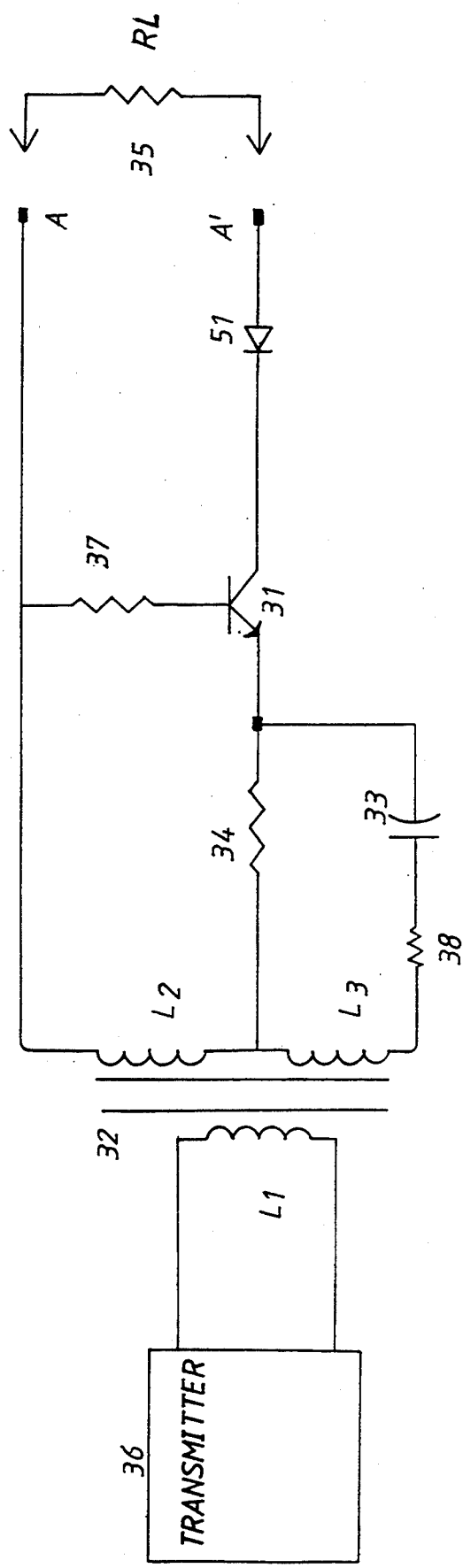
FIG. 2 is an example for the circuit drawing of the transmitting surrounding circuit for the local area network.

Referring to FIG. 2, the transmitting surrounding circuit for the local area network is a circuit composed of a basic coil L1 at the ends of Transformer 32 connected to transmitting circuit 36 and elements like a transistor 31, a electric capacitor 33, electric resistances 34, 37, 38 and secondary coils L2 and L3. The Collector end connects to the output end A' through a diode 51, and one end of a second coil L2 connects to the output end A. Load electric resistance 35 is cross connected to A and A'.

Figure 5:
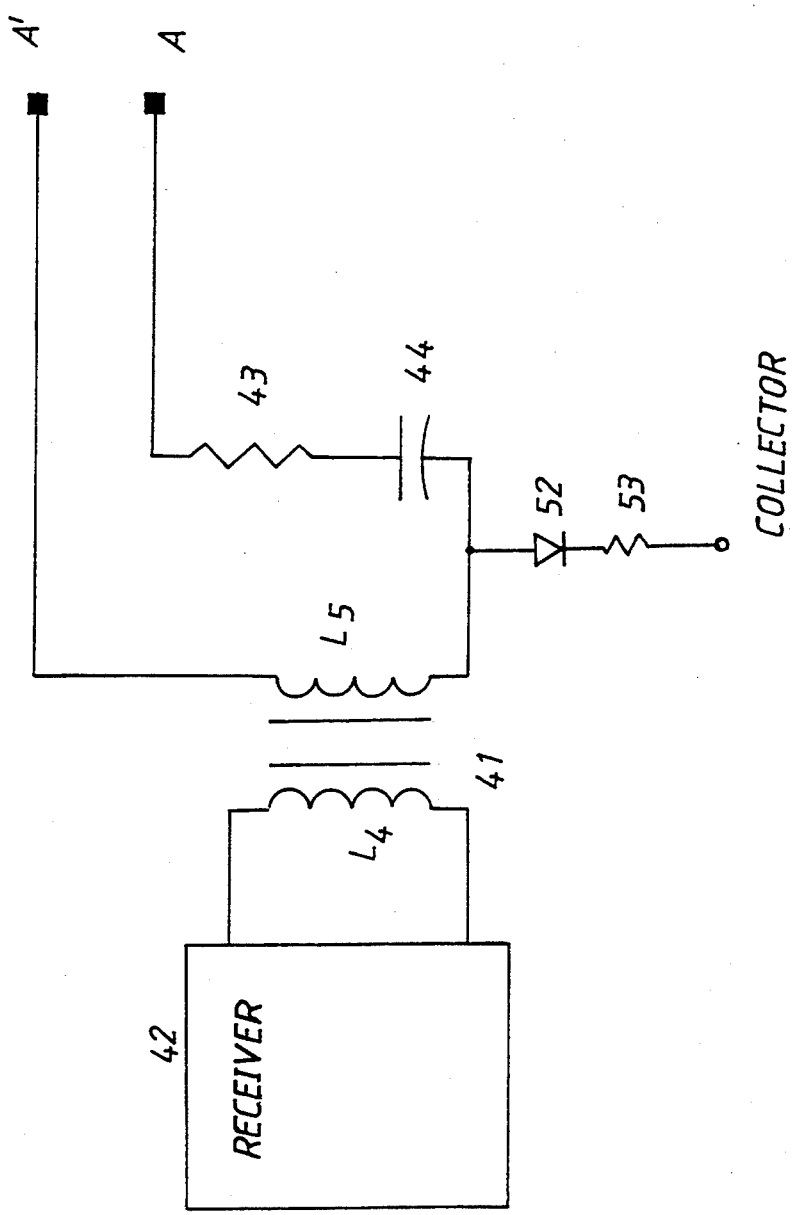
FIG. 5 is an example for the circuit drawing of the receiving surrounding circuit for the local area network.

Referring to FIG. 5, the receiving surrounding circuit is composed of a basic coil L4 of a transformer 41 series connected to the input circuit or receiver 42, one end of a secondary coil L5 connected to the output end A' and another end connected to the output end A through elements like a electric capacitor 44 and a electric resistance 43, so that its circuit cross connects to the output ends A and A'. In addition, another diode 52 is series connected and an electric resistance 53 cross connects to the collector of the transistor 31 and one end of L5.

Figure 4A:
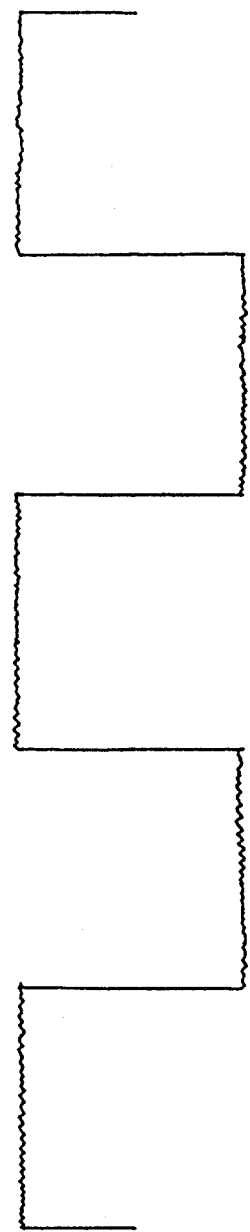
FIG. 4A is the unprocessed wave illustration.
Figure 4B:
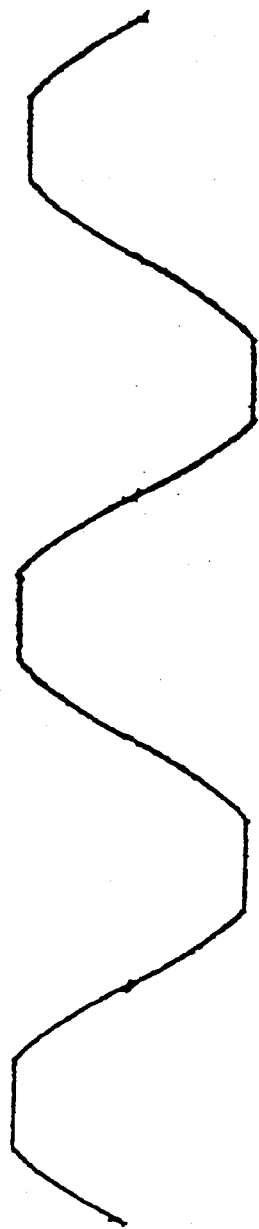
FIG. 4B is the illustration of the wave processed by the invented surrounding network.

Referring to FIGS. 2, 4, and 4B, the transformer 32 can isolate the local circuit from the load electric resistance 35, and the two ends of its basic coil series connect to the transmitting circuit 36. When the current flows to the basic coil L1 and to the secondary coils L2 and L3 through the coupling of the magnet power core. The rising time and the falling time of the signal as induced by the secondary coils L2 and L3 is provided and still short and its output waveform is as shown on FIG. 4A. To control the rising time and the falling time of the signal and make it similar to the sine wave, a waveshaping circuit is composed of elements like a capacitor 33, transistor 1, electric resistances 34, 37, 38 and the secondary coils L2 and L3 to make the output signal waveform of the output ends A and A' as shown on FIG. 4B.

Referring to FIG. 2, the NPN transistor 31 in the circuit drawing of the invent[on is similar to a current source. A damped minor circuit is composed of elements like a capacitor 33, a electric resistance 38, a secondary coil L3 of the transformer 32, and a electric resistance 34. The damped minor circuit connects to one end of the secondary coil L2 and the emitter of the transistor 31. When the secondary coil L2 is to turn on the transistor 31 rapidly, the damped minor circuit will slow down the falling time of the transistor 31 and its excess power is charged to a capacitor 33 and a secondary coil L3. When the transistor 31 is turn off rapidly, the power stored in the capacitor 33 and the secondary coil L3 is released slowly which will slow down the rising time. Furthermore, due to the addition of the surrounding circuit, the output impedance is considerably increased and achieves the increase of the transmission distance and the improvement of collision phenomenon.

Referring to FIG. 5, the receiving surrounding circuit aims at the isolation effect of the receiving circuit or receiver 42 which is accomplished by the transformer 41. The capacitor 44 is used for rejecting the direct current and the electric resistance 43 for increasing the input impedance. When the Common Mode Noise occurs at the output ends A and A', the potential difference at the two ends of the secondary coil L5 is zero. Consequently, no current passes through the secondary coil L5 and the basic coil L4 will not induced such noise The secondary coil L5 and the capacitor 44 is series connected to the electric resistance 43 and can provide extra impedance and will not interfere the aforesaid damped minor circuit.

Referring to FIG. 5, when high-frequency signal appears at the ends A and A'. It can pass the electric resistance 43, the electric capacitor 44 and the two ends of the secondary coil L5 to enable the basic coil L4 to induct and deliver it to he receiving circuit 42. On the other hand, when low-frequency collision appears at the ends A and A', the electric capacitor 44 has high impedance to the low-frequency and the secondary coil L5 has relatively lower impedance to it. Therefore, the basic coil L4 can not induct enough low-frequency signal to be monitored by the receiving circuit 42. For this reason, he invention provides a diode 52 and the electric resistance 53 connected between the collector of the transistor 31 and one end of the secondary coil L5. When the transmitting circuit 36 transmits signals and the low-frequency signal appears at the ends of A and A', the current gathers at the collector of he transistor 31 through the diode 51, and the secondary coil L5 through another diode 52 and the electric resistance 53. Then it returns to the end A from the emitter of the transistor 31 through the electric resistance 34 and the secondary coil L2. Thus, the low-frequency signal is kept away from the electric capacitor 44 and the electric resistance 43 and directly crosses over the two ends of L5 through diode 52 and resistance 53. This enables the signal to be easily monitored and detected by the receiver 42.

Figure 6:
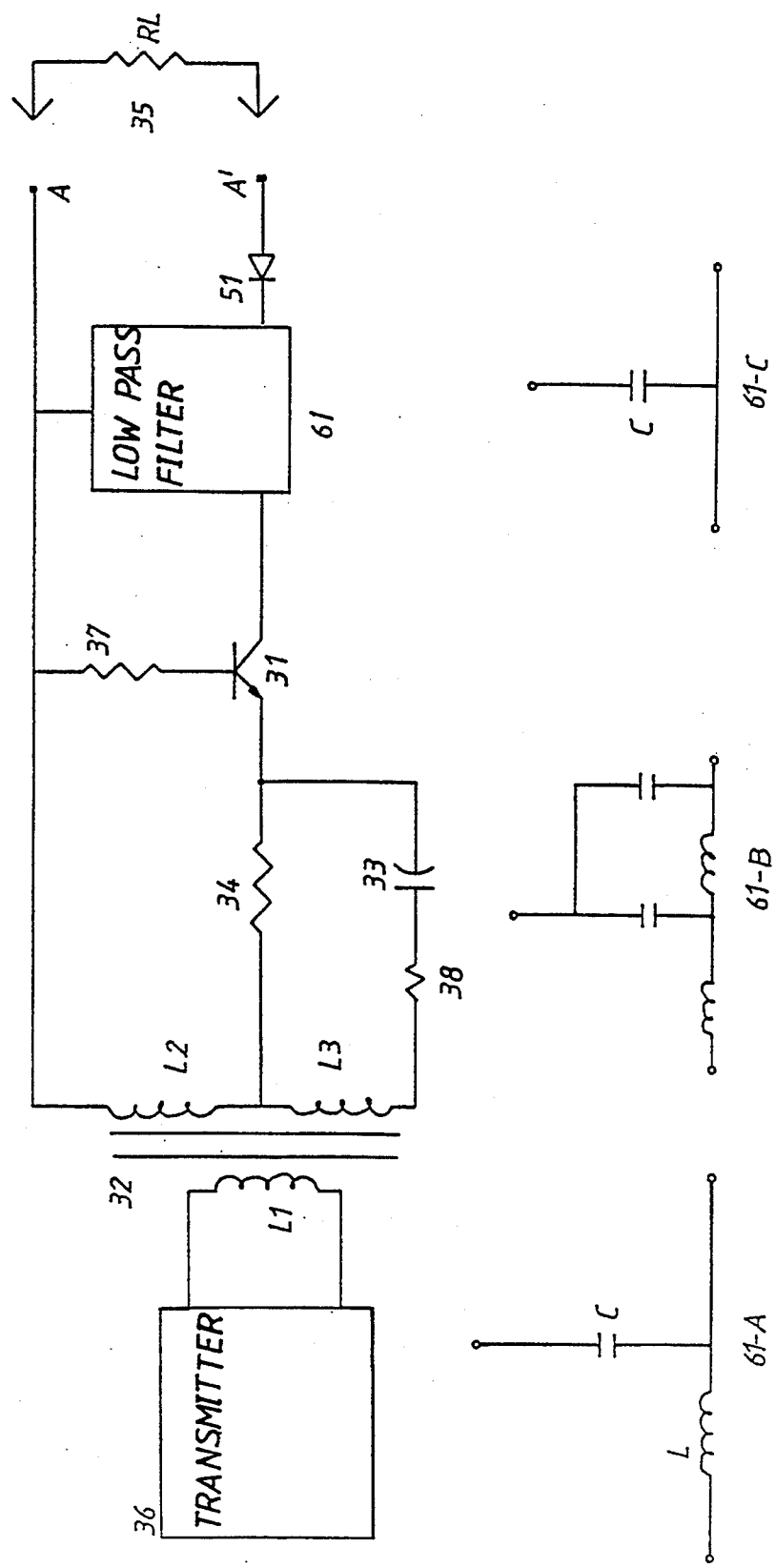
FIG. 6 is another example for the circuit drawing of the transmitting surrounding circuit for the local area network.
Figure 6A:
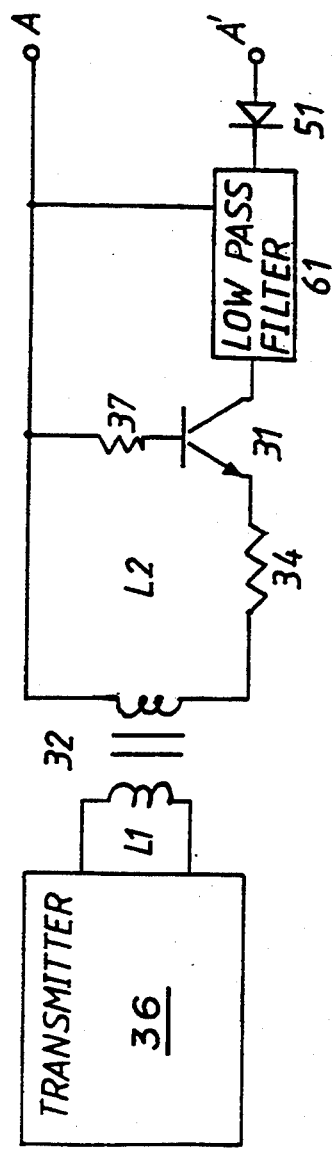
FIG. 6A is a further example for the circuit drawing of the transmitting surrounding circuit for the local area network.

Referring to FIG. 6 and FIG. 6-A in order to obtain better waveform without affecting other characteristics, a Low Pass Filter 61 can be added to the transmitting surrounding circuit. The Low Pass Filter can be C, LC, LRC or others which has the effect of Low Pass waveform. See FIGS. 61-A, 61-B, and 61-C. In a situation of low cost and less demanding requirements, such as the presence of a high permeability core in the transformer, L3 of transformer 32, resistance 38, and capacitance 33 can be deleted from the transmitting surrounding circuit. However, the electric capacitor 33, the transistor 31 and the electric resistances 34 and 38 are more effective.

Figure 7:
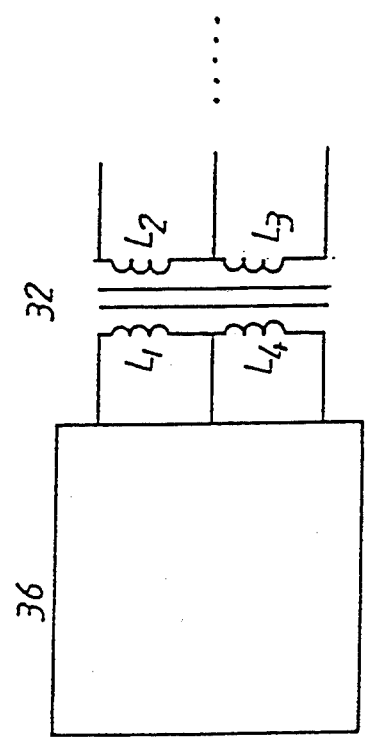
FIG. 7 is a further example for the circuit drawing of the transmitting surrounding circuit for the local area network.

Referring to FIG. 7, in the transmitting circuit for the surrounding circuit for the local area network transreceiver, the pushed transformer 32 of the transmitting circuit 36 can be altered to push pull type to neutralize the magnet accumulation in the transformer so as to obtain better efficiency. A set of coil L4 needs to be added.

To sum up, the surrounding circuit for the Ethernet coaxial local area network transceiver indeed provides the required approxiate sine wave and decreases the possibility of FCC failure as well as to eliminate the Common Mode Noise. Meanwhile, it maintains the high impedance and can monitor the high-frequency and low-frequency signals. The surrounding circuit for the transmitter does not use any power source, and its power comes from the induction of signals passing through the transformer. During transmitting the transistor current source is of high impedance and when off duty the transistor does not serve as a current source. therefore, a diode 51 is connected to the output end A' and the collector of the transistor to maintain the high impedance of the surrounding circuit. Moreover, the surrounding circuit for the receiver also does not use any power source and by means of the circuit structure, it can receive other low-frequency signals during transmitting.

I claim:

1. A surrounding circuit for the local area network transmitter comprising a transformer, a transmitting circuit, electric resistances, an electric capacitor, a transistor, load resistances, and a diode;

the transformer has at least one set of series connected secondary coils, and a basic coil of the transformer is connected to the transmitting circuit, one end of the secondary coils is connected to a first end of an output and to a base of the transistor through a first electric resistance, and another end of the secondary coils is coupled to an emitter of the transistor through a second serial connected electric resistance and the electric capacitor; and the emitter of the transistor is also connected to a center tap of the secondary coils through a third electric resistance;

a collector of the transistor is connected to a second end of the output through the diode;

wherein inducting signals passing through the transformer from the transmitting circuit generate power for operating the surrounding circuit, thereby permitting control of rising time and falling time of the signals and enhancing output impedance without use of externally supplied power.

2. The surrounding circuit for the local area network transmitter according to claim 1, further including a Low Pass Filter having one end connected between the collector of the transistor and the diode and another end connected to the second end of the output.

3. The surrounding circuit for the local area network transmitter according to claim 1, wherein a transformer for the transmitting circuit is a push-pull transformer.

4. A surrounding circuit for the local area network receiver according to claim 1, further comprising a receiving circuit, a second transformer, a second electric capacitor, fourth and fifth electric resistances and a second diode; wherein basic coils of the second transformer are connected to the receiving circuit, one end of a secondary coil of the secondary transformer is connected to the second end of the output and another end of the secondary coil of the second transformer is connected to the first end of the output through the second capacitor and the fourth electric resistance, and the second diode serial connected to the fifth electric resistance is cross connected to the collector of the transistor serving as a current source and to the another end of the secondary coil of the second transformer; thereby forming a circuit which receives low-frequency signal when the transmitter is turned on, receives high-frequency signal when the transmitter is turned off, while in both cases, maintaining high input impedance.

5. A surrounding circuit for the local area network transmitter comprising a transformer, a transmitting circuit, electric resistances, an electric capacitor, a transistor, load resistances, and a diode;

the transformer has at least one set of series connected secondary coils, and a basic coil of the transformer is connected to the transmitting circuit, one end of the secondary coils is connected to a first end of an output and to a base of the transistor through a first electric resistance, and another end of the secondary coils is coupled to an emitter of the transistor through a second electric resistance; and a collector of the transistor is connected to a second end of the output through the diode;

wherein inducting signals passing through the transformer from the transmitting circuit generate power for operating the surrounding circuit, thereby permitting control of rising time and falling time of the signals and enhancing, output impedance without use of externally supplied power.

* * * * *